(12) United States Patent
Bhattiprolu et al.

(10) Patent No.: US 7,546,352 B1
(45) Date of Patent: Jun. 9, 2009

(54) METHOD TO AUTOMATICALLY MERGE E-MAIL REPLIES

(75) Inventors: Sukadev Bhattiprolu, Beaverton, OR (US); Haren Myneni, Tigard, OR (US); Malahal R. Naineni, Tigard, OR (US); Badari Pulavarty, Beaverton, OR (US); Chandra S. Seetharaman, Portland, OR (US); Narasimha N. Sharoff, Beaverton, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/192,343

(22) Filed: Aug. 15, 2008

(51) Int. Cl.
*G06F 15/16* (2006.01)
*G06F 15/173* (2006.01)

(52) U.S. Cl. .................. 709/206; 709/204; 709/205; 709/218; 709/224

(58) Field of Classification Search ............. 709/204, 709/205, 206, 218, 224
See application file for complete search history.

(56) References Cited

U.S. PATENT DOCUMENTS

| 7,386,592 | B2 | 6/2008 | Truty | |
|---|---|---|---|---|
| 2004/0139161 | A1* | 7/2004 | Loh | 709/206 |
| 2005/0108336 | A1* | 5/2005 | Naick et al. | 709/218 |
| 2007/0005762 | A1* | 1/2007 | Knox et al. | 709/224 |
| 2008/0162643 | A1 | 7/2008 | Flach | |
| 2008/0244027 | A1* | 10/2008 | Foulger et al. | 709/206 |

FOREIGN PATENT DOCUMENTS

WO   WO99/24955 A1   5/1999

* cited by examiner

*Primary Examiner*—Quang N. Nguyen
(74) *Attorney, Agent, or Firm*—Shimokaji & Associates, P.C.

(57) ABSTRACT

A method for automatically merging e-mail replies containing reviewer comments to open source software code is disclosed. Individual reply messages may be identified for merger and evaluated for comments for each line of code. Comments, context information, and reviewer information may then be extracted and incorporated into a merged reply message where each line of code commented on contains comments associated with that line of code. The merged reply message may then be transmitted back to the sender with the incorporated comments.

1 Claim, 4 Drawing Sheets

102 — SENDER E-MAILS THE FOLLOWING:

```
110 {+ STATIC VOID SET_PAGE_BOOTMEM_INFO(UNSIGNED LONG INFO, STRUCT PAGE *PAGE,
   +                                     UNSIGNED LONG FLAG)
   +{
   +
   +       IF (FLAG == SECTION_INFO)                                  ← 105
   + 115          ATOMIC_SET(&PAGE->_MAPCOUNT, SECTION_MAGIC);
   +       ELSE
   +              ATOMIC_SET(&PAGE->_MAPCOUNT, NODE_INFO_MAGIC);      ← 107
   +
   +    120 { SETPAGEPRIVATE(PAGE);
   +    125 { SET_PAGE_PRIVATE(PAGE,INFO);
   +
   +}
```

FIG. 1A

```
      REVIEW1 REPLIES:
182 {  ------------
      REVIEWER1 SAYS:  ←180

> +       IF (FLAG == SECTION_INFO)                                  ← 135
> + 115         ATOMIC_SET(&PAGE->_MAPCOUNT, SECTION_MAGIC);
> +       ELSE
> +              ATOMIC_SET(&PAGE->_MAPCOUNT, NODE_INFO_MAGIC);      ← 107
> +
> +    120 {SETPAGEPRIVATE(PAGE);

YOU CAN'T USE SETPAGEPRIVATE() HERE.} 130
```

FIG. 1B

```
      REVIEWER2 REPLIES:
186 { ------------
      REVIEWR2 SAYS: ←185

|+ STATIC VOID SET_PAGE_BOOTMEM_INFO(UNSIGNED LONG INFO, STRUCT PAGE *PAGE,
110 { |+                                   UNSIGNED LONG FLAG)      ← 145
      |+{                                                            ← 107

CAN YOU NAME THE FUNCTION APPROPRIATELY?} 140
```

FIG. 1C-1

```
|+
|+      ⎡IF (FLAG == SECTION_INFO)
|+ 115 ⎨        ATOMIC_SET(&PAGE->_MAPCOUNT, SECTION_MAGIC);
|+      ⎢ELSE
|+      ⎣        ATOMIC_SET(&PAGE->_MAPCOUNT, NODE_INFO_MAGIC);
```

DON'T USE MAPCOUNT.} 150

FIG. 1C-2

```
    ⎡REVIEWER3 REPLIES:                                                        155
192⎨-----------------
    ⎣REVIEWER3 SAYS: ─ 190
```

```
110 ⎡% + STATIC VOID SET_PAGE_BOOTMEM_INFO(UNSIGNED LONG INFO, STRUCT PAGE *PAGE,
    ⎣% +                               UNSIGNED LONG FLAG)
     % +{
     % +
     % +    IF (FLAG == SECTION_INFO)                          ⎤
     % +          ATOMIC_SET(&PAGE->_MAPCOUNT, SECTION_MAGIC);  ⎬ 115
     % +    ELSE                                                ⎥
     % +          ATOMIC_SET(&PAGE->_MAPCOUNT, NODE_INFO_MAGIC);⎦
     % +
     % +    SETPAGEPRIVATE(PAGE); } 120                                       ← 107
```

NOT A PROPER USE OF SETPAGEPRIVATE(). } 160

```
     % +    SET_PAGE_PRIVATE(PAGE, INFO); } 125
     % +
     % +}                                        ─ 195
170 { NACK, THIS PATCH IS BOGUS. DON'T APPLY. ◄
```

SAMPLE OUTPUT:
-----------------

```
110 ⎡+ STATIC VOID SET_PAGE_BOOTMEM_INFO(UNSIGNED LONG INFO, STRUCT PAGE *PAGE,
    ⎣+                                UNSIGNED LONG FLAG)
     +{                ─ 185
186 {REVIEWER2 SAYS:
     CAN YOU NAME THE FUNCTION APPROPRIATELY? } 140
                                                                              ← 107
     ⎡+
     ⎢+      IF (FLAG == SECTION_INFO)
115⎨+            ATOMIC_SET(&PAGE->_MAPCOUNT, SECTION_MAGIC);
     ⎢+      ELSE
     ⎣+            ATOMIC_SET(&PAGE->_MAPCOUNT, NODE_INFO_MAGIC);
    ⎡REVIEWER2 SAYS:
186⎨
    ⎣DON'T USE MAPCOUNT. } 150
```

FIG. 1E-1

```
+
+       120 {SETPAGEPRIVATE(PAGE);
+       125 {SET_PAGE_PRIVATE(PAGE, INFO);
```

182 { REVIEWER1 SAYS: ─── 180

YOU CAN'T USE SETPAGEPRIVATE() HERE. } 130

192 { REVIEWER3 SAYS: ─── 190

NOT A PROPER USE OF SETPAGEPRIVATE(). } 160

```
+
+}
```

192 { REVIEWER3 SAYS: ─── 190

NACK, THIS PATCH IS BOGUS. DON'T APPLY. } 170

FIG. 1E-2

METHOD TO AUTOMATICALLY MERGE E-MAIL REPLIES

BACKGROUND OF THE INVENTION

The present invention is related to the field of software development and, more particularly, to a method and system of merging e-mail replies containing software comments and revisions.

Open source development of software can be a very inclusive process relying on feedback from multiple sources. Open source software, by definition, may be freely accessed and modified by a group of individuals. Software code can, in some instances, be large, cumbersome, and difficult to manage by a single individual. Thus, one manner of expediting the development of open source software code is to exchange comments among members of an e-mail listserve.

A member of the listserve may post a piece of code, sometimes known as a patch, to the other members of the listserve. The other members may review the patch and post back to the sender comments, suggestions or alternatives to the posted patch. The sender may then have to read each reply message individually for comments based on the code while scrolling within each message for reference to which each comment pertains. Since other members are free to comment in an individual manner, comments can be inserted at the beginning of an individual reply message or be manually weaved into the original message and code. In some cases, the sender may miss some of the comments. Additionally, in other cases, the sender is set to the task of extracting and organizing multiple reply message comments relevant to the same line of code which may be commented on by multiple people.

Hence, there is a need for an improved method and system of merging e-mail replies containing comments and revisions to open source software.

SUMMARY OF THE INVENTION

A method for automatically merging e-mail replies to a sender, comprises, creating an original e-mail message including a software code for review; optionally, embedding encoded portions of context information into the original e-mail message; transmitting the original e-mail message with the software code for review to a predetermined group of software reviewers; optionally, associating individual review comments to the embedded portions of context information; incorporating individual reviewer comments directed to code lines of the software code into individual reply messages; identifying reply messages to merge into a single consolidated merged reply message; stripping out user-defined indentations from the software code in individual reply messages added by the reviewers; scanning the reply messages for the presence of encoded context information; using the encoded context information if present to identify a specific code line of software code in the original e-mail message a reviewer comment is associated with; alternatively, applying a pattern matching technique to the reviewer comments and code lines of individual reply messages to associate one of the reviewer comments to a specific code line of software code in the original e-mail message; attaching an indication of reviewer information along with the associated reviewer comments; merging the associated reviewer comments into the single consolidated merged reply message; grouping reviewer comments and indications of reviewer information common to a specific code line together; optionally, grouping reviewer comments and indications of reviewer information common to a specific encoded portion of context information together; placing the reviewer comments at the top or bottom of the merged reply message when pattern matching techniques fail to associate the reviewer comments with a specific code line; collapsing sections of software code from view in the merged reply message that do not contain reviewer comments; and transmitting the merged reply message back to the sender.

These and other features, aspects and advantages of this invention of the present invention will become better understood with reference to the following drawings, description, and claims.

BRIEF DESCRIPTION OF THE FIGURES

FIG. 1A illustrates a system employing an e-mail message in accordance with the principles of the invention;

FIG. 1B illustrates a first e-mail reply message to the e-mail message of FIG. 1A;

FIG. 1C illustrates a second e-mail reply message to the e-mail message of FIG. 1A;

FIG. 1D illustrates a third e-mail reply message to the e-mail message of FIG. 1A;

FIG. 1E illustrates a merged e-mail reply message incorporating the e-mail reply messages of FIGS. 1B-1D.

DETAILED DESCRIPTION

Figure 1F:
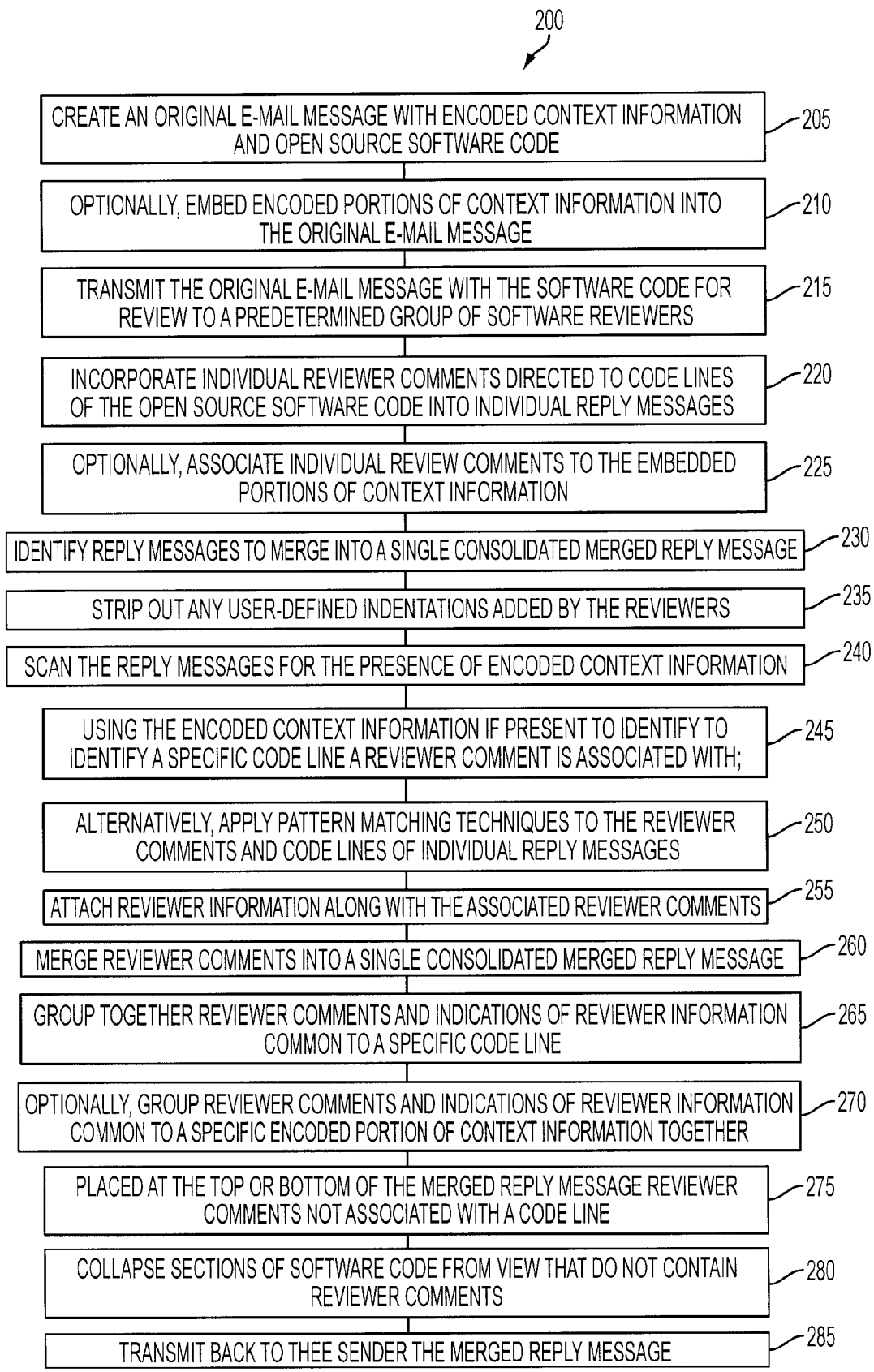
FIG. 1F illustrates a flow chart of an exemplary method in accordance with the principles of the invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

FIGS. 1A-1E illustrate a system 100 of automatically merging e-mail replies containing reviewer comments. Referring specifically to FIG. 1A, an original e-mail message 101 may be created by a sender 102 containing open source software code 105 and encoded context information 107. The open source software code 105 may be organized into exemplary code lines 110, 115, 120, and 125. Encoded context information 107 may include, for example, a line number, formatting features of the e-mail, message, portions of the original mail such as paragraphs or pages, embedded protocols, headers, fields, body sections, and character sets. Incorporating the system 100 automatic mail merge may be further illustrated with reference to FIGS. 1B-1D.

In FIG. 1B, an exemplary reply message 135 from a reviewers 180 is illustrated. The reviewer 180 may be identified by reviewer information 182. The reply message 135 may contain selected portions of the software code 105 from the original e-mail message 101 shown in FIG. 1A for commenting. In this case, the selected portions of software code 105 may be shown as code lines 115 and 120. The reply message 135 from reviewers 180 may also contain a reviewer comment 130 displaying notes, suggestions, or evaluations of the selected code lines 115 and 120 for review. Similarly, in FIG. 1C, another exemplary reply message 145 from a reviewer2 185 (identified by reviewer information 186) may also contain selected code lines 110 and 115 of the software code 105 from the original e-mail message 101 as well as the encoded context information 107. It will be understood that in one reply message, such as illustrated in reply message 145, more than one reviewer comment may be employed. In FIG. 1C for example, reviewer2 185 makes a request in reviewer comment 140 regarding code line 110. Reviewer2 185 also makes a second reviewer comment 150 within the reply message 145 directed at code line 115.

In FIG. 1D, a reply message 155 illustrates more reviewer comments 160 and 170 directed at code line 120 and a general comment from a reviewer3 190 as identified by reviewer information 192. Reviewer comment 170 depicts how one may want to insert a comment in general about the software code 105, which may be placed in the reply message 155 unassociated with any particular code line. In this case, the reviewer comment 170 may be inserted at the end of the reply message 155. Additionally, reviewer3 190 may comment on the same code line 120 as done by reviewers 180. Thus, one may appreciate that in separate reply messages 135 and 155 a code line (120) of software code 105 may be reviewed and commented on by more than one software reviewer.

Thus, a system 100 merging e-mail reply messages 135, 145, and 155 may be shown by incorporating the content of each into a single merged reply message 175 as illustrated in FIG. 1E. The merged reply message 175 may merge reviewer information (182, 186, 192) and reviewer comments 130, 140, 150, 160, and 170 associated with specific code lines such as code lines 110, 115, 120, and 125 where appropriate. For example, code lines 110 and 115 were reviewed and commented on by reviewer2 185 in FIG. 1B. Thus, the reviewer comments 140 and 150 from the reply message 135 may be incorporated into the merged reply message 175 adjacent the code lines 110 and 115 respectively. As, reviewer2 185 was the only one to comment on code lines 110 and 115 in the illustrative examples of FIGS. 1B-1D, then for this exemplary scenario, the reviewer comments 140 and 150 may be the only selected comments associated with the specific code lines 110 and 115 respectively in reply message 175. To further illustrate the system 100, FIG. 1E also depicts merging comments in a scenario where more than one individual comments on a particular code line, such as code line 120. In FIGS. 1B and 1D, reviewer1 180 and reviewer3 190 both illustratively commented on code line 120 submitting respective reviewer comments 130 and 160. As shown in FIG. 1E, the reviewer comments 130 and 160 are inserted together in the merged e-mail reply message 175 adjacent to the code line 120. It will be understood that the order of reviewer comments 130 and 160 may be organized according to preferences set by the sender 102.

Additionally, FIG. 1E shows how a reviewer comment 170 not associated with any particular code line may be placed in a separate area 195 of the merged reply message 175 such as at the top or in this case, the bottom of the merged reply message 175.

FIG. 1F, illustrates a flow chart of an exemplary method 200 for automatically merging e-mail reply messages with reviewer comments. At block 205, a sender 102 may create an original e-mail message 101 with open source software code 105 for review. In block 210, the original e-mail message 101 may optionally be embedded with encoded portions of context information 107. The sender 102 may then transmit the original e-mail message 101 with the software code 105 for review to a predetermined group of software reviewers 180; 185; and 190 in block 215. Upon receipt of the original e-mail message 101, the software reviewers 180; 185; and 190 may respond to the sender 102 by incorporating individual reviewer comments 130, 140, 150, 160, and 170 directed to code lines 110, 115, 120, and 125 of the open source software code 105 into individual reply messages 135, 145, and 155 in block 220. In block 225, individual review comments 130, 140, 150, 160, and 170 may optionally be associated to embedded portions of the context information 107. In block 230, the method 200 may then identify reply messages 135, 145, and 155 to merge into a single consolidated merged reply message 175. Upon identifying the reply messages 135, 145, and 155 for merger, any user-defined indentations added by the reviewers may be stripped out from the software code 105 contained in individual reply messages 135, 145, and 155 (block 235). In block 240, reply messages 135, 145, and 155 may be scanned for the presence of encoded context information 107. Pattern matching techniques may be applied to the reviewer comments 130, 140, 150, 160, and 170 and code lines 110, 115, 120, and 125 of individual reply messages 135, 145, and 155. In block 245, the encoded context information may be used to identify a specific code line (110, 115, 120, and 125) a reviewer comment (130, 140, 150, 160, and 170) is associated with. The pattern matching techniques may associate one or more of the reviewer comments (130, 140, 150, 160, and 170) to one of a specific code line from code lines (110, 115, 120, and 125) (block 250). In block 255, reviewer information (182, 186, 192) may be attached along with the associated reviewer comments (130, 140, 150, 160, and 170). In block 260, the reviewer comments 130, 140, 150, 160, and 170 may be merged into a single consolidated merged reply message 175. In the reply message 175, reviewer comments 130, 140, 150, 160, and 170 and indications of reviewer information 182, 186, 192 common to a specific code line may be grouped together (block 265). Optionally, in block 270, reviewer comments 130, 140, 150, 160, and 170 and indications of reviewer information 182, 186, 192 common to a specific encoded portion of context information 107 may be grouped together. When reviewer comments 130, 140, 150, 160, and 170 can not be associated with a code line 110, 115, 120, and 125, the reviewer comments may be placed at the top or bottom of the merged reply message in block 275. Additionally, sections of software code 105 that do not contain reviewer comments 130, 140, 150, 160, and 170 may be collapsed from view (block 280). In block 285, the merged reply message 175 may be transmitted back to the sender 102.

While the foregoing has been described in the context of merging replies to an original e-mail message 101, it will be understood that other exemplary embodiments may be possible. For example, the method 200 can optionally include steps to associate reviewer comments 130, 140, 150, 160, and 170 with the embedded encoded context information 107. The system 100 may scan reply messages 135, 145, or 155 for context information 107 for use as landmarks when placing associated reviewer comments {130;140;150;160;170} within the merged reply message 175. For example, a reply message 135,145, or 155 may also be scanned for selected fields (not shown) or embedded protocols (not shown) for placement of associated reviewer comments {130; 140; 150; 160; 170}. A sender 102 may then search for reviewer comments in the merged reply message 175 by referring to locations according to context information 107 when available. In a situation where context information 107 may not be available, then the sender 102 may apply pattern matching techniques to find a location in the merged reply message 175.

Additionally, it will be understood that e-mail protocol used in transmitting reply messages 135, 145, or 155 may be extended to include context information 107 where available. In another exemplary embodiment, that the system 100 may also merge reply messages 135, 145, and 155 at different levels of an e-mail thread. For example, the reply messages 135, 145, and 155 may represent reply messages beyond a first level of reply. In other words, they may represent a reply to a reply of a reply. By employing the use of embedded context information 107, reply messages 135, 145, and 155 at different levels of an e-mail thread may be scanned for reviewer comments associated with common context information. Thus, reviewer comments associated with common context information 107 may be grouped together in a merged reply message 175.

It should be understood, of course, that the foregoing relates to exemplary embodiments of the invention and that modifications may be made without departing from the spirit and scope of the invention as set forth in the following claims.

What is claimed is:

1. A method of automatically merging e-mail replies to a sender, comprising:
   creating an original e-mail message including a software code for review;
   embedding encoded portions of context information into the original e-mail message;
   transmitting the original e-mail message with the software code for review to a predetermined group of software reviewers;
   associating individual reviewer comments to the embedded encoded portions of context information;
   incorporating the individual reviewer comments directed to code lines of the software code into individual reply messages;
   identifying reply messages to merge into a single consolidated merged reply message;
   stripping out user-defined indentations from the software code in individual reply messages added by the reviewers;
   scanning the reply messages for the presence of encoded context information;
   using the encoded context information if present to identify a specific code line of software code in the original e-mail message a reviewer comment is associated with;
   applying a pattern matching technique to the reviewer comments and code lines of individual reply messages to associate one of the reviewer comments to a specific code line of software code in the original e-mail message;
   attaching an indication of reviewer information along with the associated reviewer comments;
   merging the associated reviewer comments into the single consolidated merged reply message;
   grouping reviewer comments and indications of reviewer information common to a specific code line together;
   grouping reviewer comments and indications of reviewer information common to a specific encoded portion of context information together;
   placing the reviewer comments at the top or bottom of the merged reply message when pattern matching techniques fail to associate the reviewer comments with a specific code line;
   collapsing sections of software code from view in the merged reply message that do not contain reviewer comments; and
   transmitting the merged reply message back to the sender.

* * * * *